United States Patent
Noh et al.

(10) Patent No.: US 10,181,937 B2
(45) Date of Patent: Jan. 15, 2019

(54) METHOD OF PERFORMING POWER CONTROL AND LINK ADAPTATION IN FULL DUPLEX RADIO COMMUNICATION SYSTEM AND APPARATUS FOR THE SAME

(71) Applicant: LG ELECTRONICS INC., Seoul (KR)

(72) Inventors: Kwangseok Noh, Seoul (KR); Dongkyu Kim, Seoul (KR); Hyunsoo Ko, Seoul (KR); Kukheon Choi, Seoul (KR); Sangrim Lee, Seoul (KR); Hojae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 195 days.

(21) Appl. No.: 15/173,541

(22) Filed: Jun. 3, 2016

(65) Prior Publication Data

US 2016/0359608 A1 Dec. 8, 2016

Related U.S. Application Data

(60) Provisional application No. 62/170,673, filed on Jun. 3, 2015.

(51) Int. Cl.
| | |
|---|---|
| *H04L 5/14* | (2006.01) |
| *H04L 29/08* | (2006.01) |
| *H04B 1/54* | (2006.01) |
| *H04W 52/04* | (2009.01) |
| *H04W 52/14* | (2009.01) |
| *H04W 52/24* | (2009.01) |

(52) U.S. Cl.
CPC ............. *H04L 5/1461* (2013.01); *H04B 1/54* (2013.01); *H04L 69/324* (2013.01); *H04W 52/04* (2013.01); *H04W 52/143* (2013.01); *H04W 52/243* (2013.01); *H04W 52/246* (2013.01)

(58) Field of Classification Search
CPC ....... H04L 5/1461; H04L 69/324; H04B 1/54; H04W 52/246; H04W 52/243; H04W 52/143; H04W 52/04
See application file for complete search history.

(56) References Cited

U.S. PATENT DOCUMENTS

| | | | |
|---|---|---|---|
| 2010/0029320 A1* | 2/2010 | Malladi | H04L 27/2614 455/522 |
| 2011/0019754 A1* | 1/2011 | Andrews | H04W 52/12 375/260 |

(Continued)

*Primary Examiner* — Walter J Divito
(74) *Attorney, Agent, or Firm* — Lee Hong Degerman Kang Waimey (57) ABSTRACT

Disclosed herein is method of performing self-interference cancellation in the network nodes supporting full-duplex communication. Specifically, the method includes receiving a desired signal from a user equipment (UE), performing cancellation of self-interference according to a transmitted signal of the network node, the transmitted signal using the same radio resource as the desired signal, determining whether the cancellation of the self-interference is successful, performing, upon determining that the cancellation of the self-interference is successful, decoding of the desired signal and checking cyclic redundancy check (CRC), and performing power control and link adaptation depending on success in performing the cancellation of the self-interference and a result of checking the CRC.

6 Claims, 9 Drawing Sheets

(56) References Cited

U.S. PATENT DOCUMENTS

| | | | |
|---|---|---|---|
| 2012/0320887 A1* | 12/2012 | Chintalapudi | H04W 74/0841 370/338 |
| 2013/0273834 A1* | 10/2013 | Sundstrom | H04B 7/155 455/7 |
| 2015/0043685 A1* | 2/2015 | Choi | H04L 5/143 375/346 |
| 2015/0229461 A1* | 8/2015 | DiFazio | H04L 5/14 370/280 |
| 2015/0341125 A1* | 11/2015 | Bharadia | H04B 1/00 370/277 |
| 2016/0135142 A1* | 5/2016 | Lee | H04L 1/1671 370/329 |
| 2016/0301457 A1* | 10/2016 | Liang | H04B 7/0452 |
| 2016/0301538 A1* | 10/2016 | Wei | H04L 12/1868 |
| 2017/0187513 A9* | 6/2017 | Bharadia | H04L 5/1461 |

\* cited by examiner

(a) Control-Plane Protocol Stack (b) User-Plane Protocol Stack

METHOD OF PERFORMING POWER CONTROL AND LINK ADAPTATION IN FULL DUPLEX RADIO COMMUNICATION SYSTEM AND APPARATUS FOR THE SAME

CROSS-REFERENCE TO RELATED APPLICATIONS

Pursuant to 35 U.S.C. § 119(e), this application claims the benefit of U.S. Provisional Application No. 62/170,673, filed on Jun. 3, 2015, the contents of which are all hereby incorporated by reference herein in its entirety.

BACKGROUND OF THE INVENTION

Field of the Invention

The present invention relates to a wireless communication system and, more particularly, to a method of performing power control and link adaptation in a full-duplex radio communication system and an apparatus for the same.

Discussion of the Related Art

A 3rd generation partnership project long term evolution (3GPP LTE) (hereinafter, referred to as 'LTE') communication system which is an example of a wireless communication system to which the present invention can be applied will be described in brief.

Figure 1:
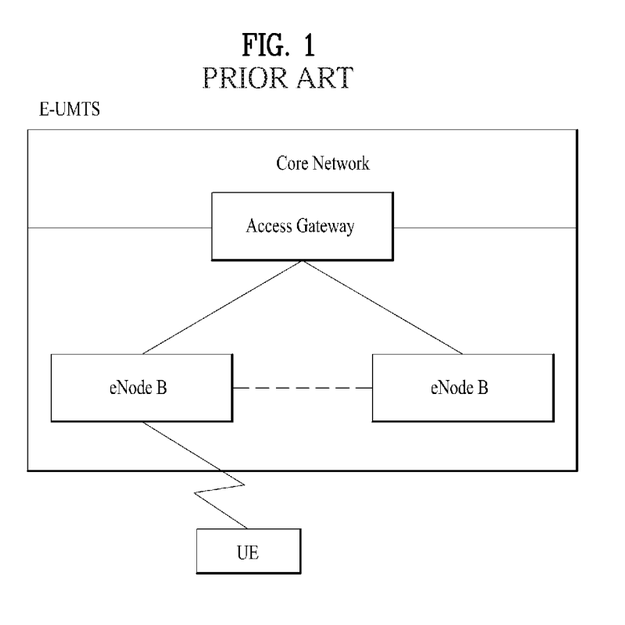
FIG. 1 schematically illustrates an E-UMTS network architecture as an example of a wireless communication system.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

SUMMARY OF THE INVENTION

Accordingly, the present invention is directed to a method of performing power control and link adaptation in a full-duplex radio communication system and an apparatus for the same that substantially obviate one or more problems due to limitations and disadvantages of the related art.

An object of the present invention is to provide a method of performing power control and link adaptation in a full-duplex radio communication system and an apparatus for the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of performing self-interference cancellation in a network node supporting full-duplex communication, the method including receiving a desired signal from a user equipment (UE), performing cancellation of self-interference according to a transmitted signal of the network node, the transmitted signal using the same radio resource as the desired signal, determining whether the cancellation of the self-interference is successful, performing, upon determining that the cancellation of the self-interference is successful, decoding of the desired signal and checking cyclic redundancy check (CRC), and performing power control and link adaptation depending on success in performing the cancellation of the self-interference and a result of checking the CRC.

When it is determined that the cancellation of the self-interference has failed, it may be determined that the decoding of the desired signal has failed.

The determining may include determining, when a result of the cancellation of a plurality of consecutive signals having passed through an analog-to-digital converter of the network node is less than or equal to a threshold, that the cancellation of the self-interference has failed.

The determining may include determining, when a difference of an error vector magnitude (EVM) from a constellation point is greater than a threshold in a demodulation operation, that the cancellation of the self-interference has failed. Further, whether the difference is greater than the threshold may be determined based on whether a strength of residual self-interference and a strength of the desired signal exceed a threshold after the cancellation of the self-interference. The determining may include determining, when the EVM is greater than a transmit power of the desired signal, that the cancellation of the self-interference has failed. Alternatively, the determining may include determining, when the EVM may be greater than a pre-stored EVM value for success of the CRC based on a power offset of the desired signal, that the cancellation of the self-interference has failed.

Further, the determining may include determining, when similarity to a self-interference signal according to decoding of an error correction code is greater than a threshold, that the cancellation of the self-interference has failed.

Further, the performing of the power control and link adaptation may include reducing a transmit power when the cancellation of the self-interference has failed.

Further, the performing of the power control and link adaptation may include raising a modulation and coding scheme (MCS) level when the cancellation of the self-interference and the CRC are successful.

Further, the performing of the power control and link adaptation may include lowering a modulation and coding scheme (MCS) level when the cancellation of the self-interference may be successful and the CRC fails.

In another aspect of the present invention, a network node for supporting full-duplex communication and performing self-interference cancellation includes a radio frequency (RF) unit, and a processor, wherein the processor may be configured to receive a desired signal from a user equipment (UE), perform cancellation of self-interference according to a transmitted signal of the network node, the transmitted signal using the same radio resource as the desired signal, determine whether the cancellation of the self-interference is successful, perform, upon determining that the cancellation of the self-interference is successful, decoding of the desired signal and checking cyclic redundancy check (CRC), and perform power control and link adaptation depending on success in performing the cancellation of the self-interference and a result of checking the CRC.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

Figure 2:
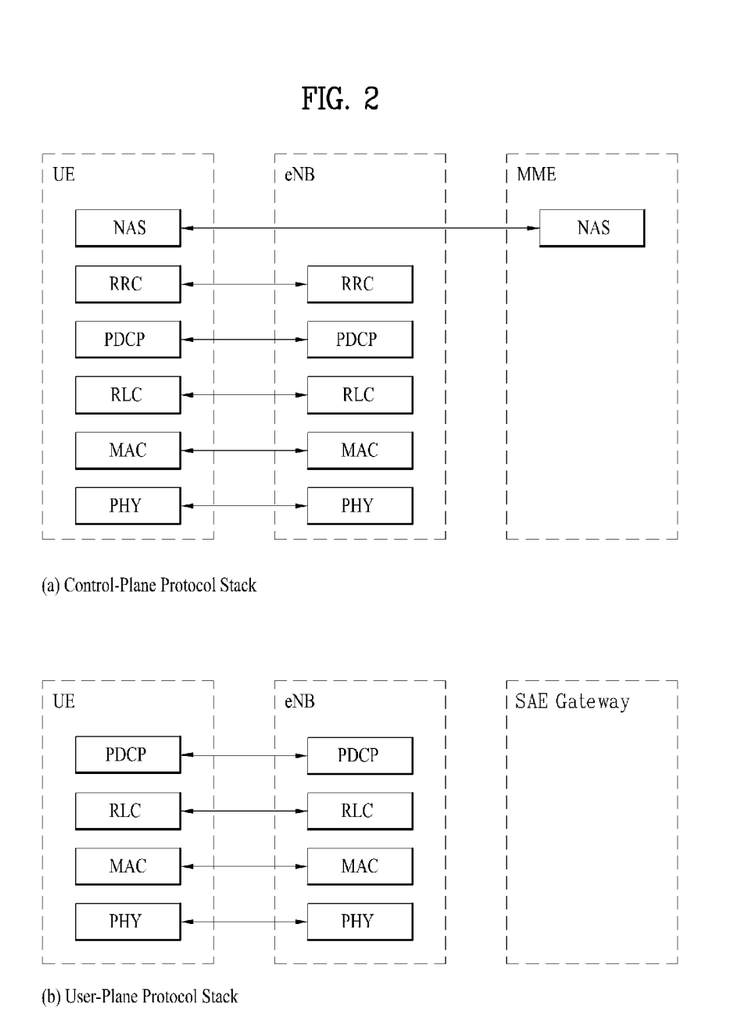
FIG. 2 illustrates a control plane and user plane of a radio interface protocol between a User Equipment (UE) and an Evolved Universal Terrestrial Radio Access Network (E-UTRAN) based on the 3rd Generation Partnership Project (3GPP) radio access network standard.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
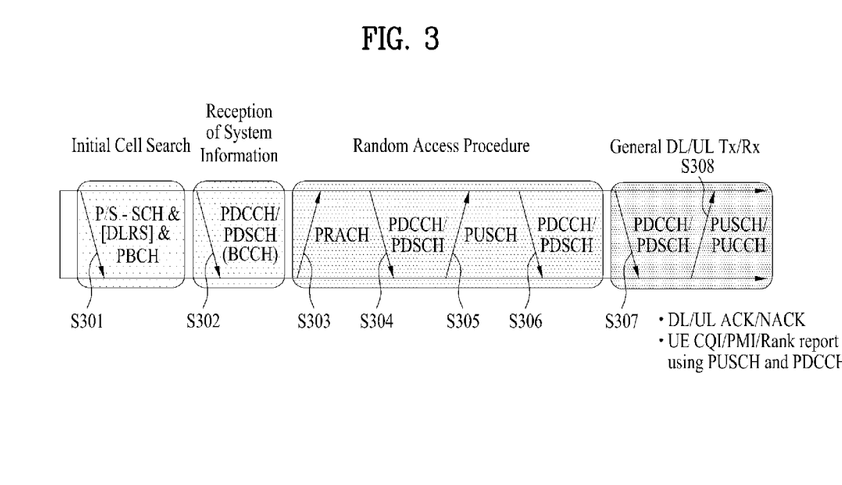
FIG. 3 illustrates physical channels used in a 3GPP system and a typical signal transmission method using the same.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
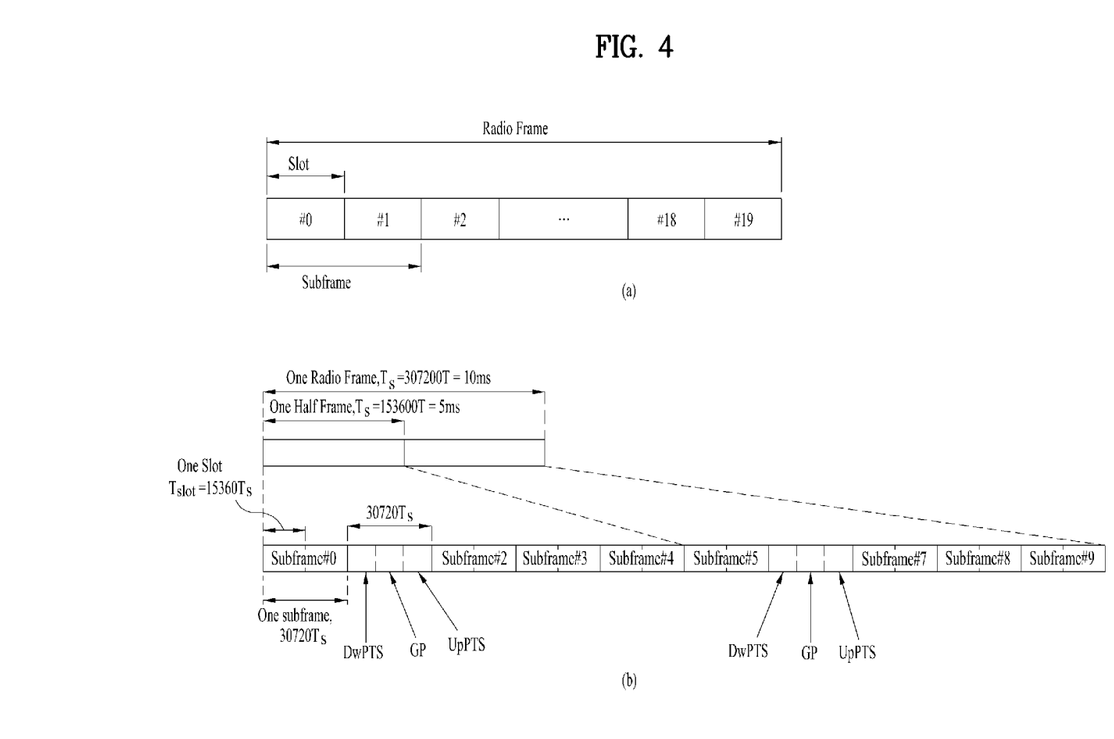
FIG. 4 illustrates the structure of a radio frame used in a Long Term Evolution (LTE) system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000\times2048)$, and the other region is configured for the guard period.

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
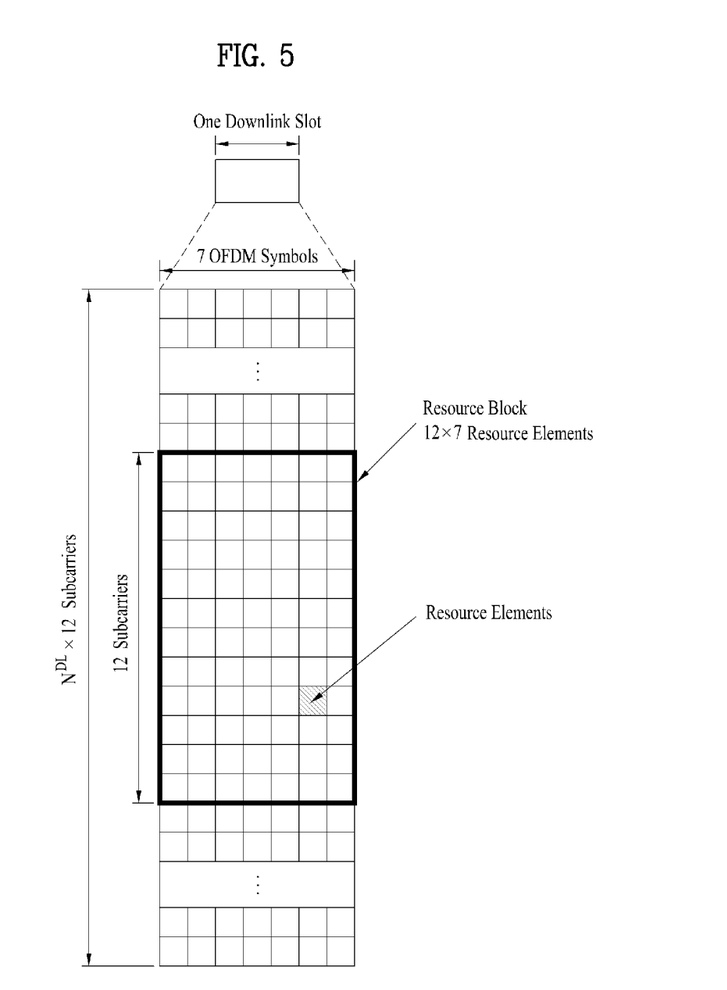
FIG. 5 illustrates a resource grid for a downlink (DL) slot.

FIG. 5 is a diagram illustrating a resource grid of a downlink slot.

Referring to FIG. 5, the downlink slot includes a plurality of $N_{symb}^{DL}$ OFDM symbols in a time domain and a plurality of $N_{RB}^{DL}$ resource blocks in a frequency domain. Since each resource block includes $N_{sc}^{RB}$ subcarriers, the downlink slot includes $N_{RB}^{DL} \times N_{sc}^{RB}$ subcarriers in the frequency domain. Although FIG. 5 illustrates that the downlink slot includes seven OFDM symbols and the resource block includes twelve subcarriers, it is to be understood that the downlink slot and the resource block are not limited to the example of FIG. 5. For example, the number of OFDM symbols included in the downlink slot may be varied depending on the length of the CP.

Each element on the resource grid will be referred to as a resource element (RE). One resource element is indicated by one OFDM symbol index and one subcarrier index. One RB includes $N_{symb}^{DL} \times N_{sc}^{RB}$ number of resource elements. The number $N_{RB}^{DL}$ of resource blocks included in the downlink slot depends on a downlink transmission bandwidth configured in the cell.

TABLE 1

| | | Normal cyclic prefix in downlink | | | Extended cyclic prefix in downlink | | |
|---|---|---|---|---|---|---|---|
| | | | UpPTS | | | UpPTS | |
| Special subframe configuration | DwPTS | | Normal cyclic prefix in uplink | Extended cyclic prefix in uplink | DwPTS | Normal cyclic prefix in uplink | Extended cyclic prefix in uplink |
| 0 | 6592 · $T_s$ | | 2192 · $T_s$ | 2560 · $T_s$ | 7680 · $T_s$ | 2192 · $T_s$ | 2560 · $T_s$ |
| 1 | 19760 · $T_s$ | | | | 20480 · $T_s$ | | |
| 2 | 21952 · $T_s$ | | | | 23040 · $T_s$ | | |
| 3 | 24144 · $T_s$ | | | | 25600 · $T_s$ | | |
| 4 | 26336 · $T_s$ | | | | 7680 · $T_s$ | 4384 · $T_s$ | 5120 · $T_s$ |
| 5 | 6592 · $T_s$ | | 4384 · $T_s$ | 5120 · $T_s$ | 20480 · $T_s$ | | |
| 6 | 19760 · $T_s$ | | | | 23040 · $T_s$ | | |
| 7 | 21952 · $T_s$ | | | | 12800 · $T_s$ | | |
| 8 | 24144 · $T_s$ | | | | — | — | — |
| 9 | 13168 · $T_s$ | | | | — | — | — |

Figure 6:
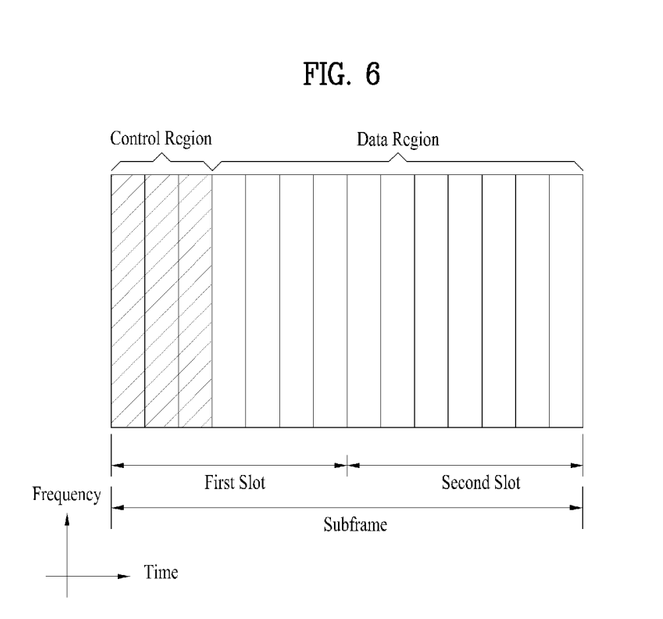
FIG. 6 illustrates the structure of a DL radio frame used in an LTE system.

FIG. 6 is a diagram illustrating a structure of a downlink subframe.

Referring to FIG. 6, maximum three (four) OFDM symbols located at the front of the first slot of the subframe correspond to a control region to which a control channel is allocated. The other OFDM symbols correspond to a data region to which a physical downlink shared channel (PDSCH) is allocated. Examples of downlink control channels used in the LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number of OFDM symbols used for transmission of the control channel within the subframe. The PHICH carries HARQ ACK/NACK (Hybrid Automatic Repeat reQuest acknowledgement/negative-acknowledgement) signals in response to uplink transmission.

The control information transmitted through the PDCCH will be referred to as downlink control information (DCI). The DCI includes resource allocation information for a user equipment or user equipment group. For example, the DCI includes uplink/downlink scheduling information, uplink transmission (Tx) power control command, etc.

The PDCCH may include transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual user equipments (UEs) within a random user equipment group, transmission (Tx) power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on the number of CCEs. The base station determines a PDCCH format depending on the DCI which will be transmitted to the user equipment, and attaches cyclic redundancy check (CRC) to the control information. The CRC is masked with an identifier (for example, radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI).

Figure 7:
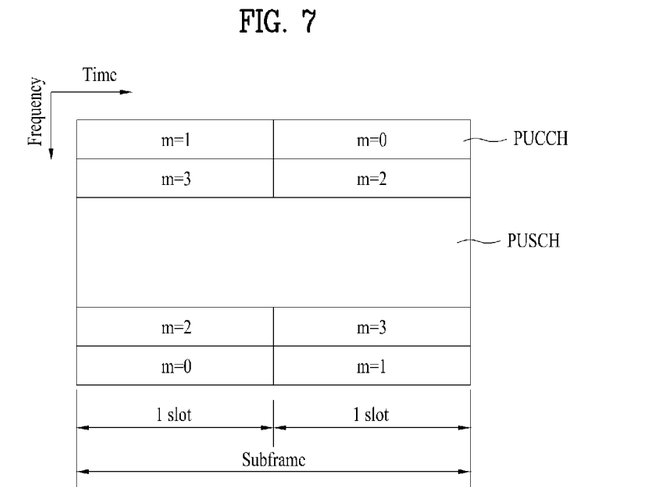
FIG. 7 illustrates the structure of an uplink (UL) subframe used in an LTE system.

FIG. 7 illustrates the structure of an uplink (UL) subframe used in an LTE system.

Referring to FIG. 7, a UL subframe includes a plurality of (e.g., 2) slots. Each slot includes a different number of SC-FDMA symbols according to CP length. The UL subframe is divided into a data region and a control unit in the frequency domain. The data region includes a PUSCH and is used to transmit data signals such as voice. The control region includes a PUCCH and is used to transmit uplink control information (UCI). The PUCCH performs hopping across a slot boundary including an RB pair located at both ends of the data region in the frequency domain.

The PUCCH may be used to transmit control information described below.

Scheduling Request (SR): This is information used to request an uplink UL-SCH resource. This information is transmitted using an On-Off Keying (OOK) scheme.

HARQ ACK/NACK: This is a response signal for a downlink data packet on the PDSCH. This indicates whether a downlink data packet has been successfully received. As a response to a single downlink codeword, 1-bit ACK/NACK is transmitted. As a response to two downlink codewords, 2-bit ACK/NACK is transmitted.

Channel State Information (CSI): This is feedback information about a downlink channel. The CSI includes a channel quality indicator (CQI), and feedback information related to Multiple Input Multiple Output (MIMO) includes a rank indicator (RIA), a precoding matrix indicator (PMI), and a precoding type indicator (PTI). This information uses 20 bits per subframe.

The amount of UCI transmittable by a UE in a subframe depends on the number of SC-FDMAs available for transmission of the UCI. The SC-FDMAs available for transmission of the UCI refers to SC-FDMA symbols other than SC-FDMA symbols for transmission of a reference signal in a subframe. For a subframe in which a sounding reference signal (SRS) is configured, the last SC-FDMA symbol of the subframe is also excluded from the available symbols. The reference signal is used for coherent detection of the PUCCH.

Hereinafter, a description will be given of a method of performing control and link adaptation simultaneously for self-interference and desired information (a desired signal) to be received in a system adopting full-duplex communication within the same resource, and an apparatus for the same.

Figure 8:
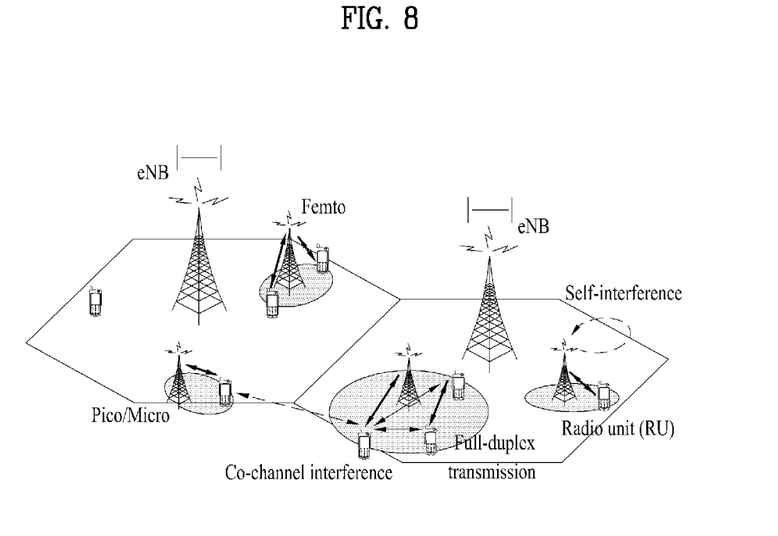
FIG. 8 illustrates a full-duplex radio (FDR) communication system.

FIG. 8 is a reference diagram illustrating a full-duplex radio (FDR) communication system according to an embodiment of the present invention. Referring to FIG. 8, FDR represents a system in which a transmitter (e.g., a UE, a BS) performs transmission and reception simultaneously using the same resource. Herein, the same resource refers to a radio resource assigned the same time or same frequency. As shown in FIG. 8, there may be a UE and BS which support FDR. In this case, two kinds of interference, namely intra-device interference and inter-device interference may occur. The intra-device interference refers to interference which a signal transmitted from a transmit antenna applies to a receive antenna that receives the signal in one BS or UE. Inter-device interference refers to interference which an uplink signal transmitted by a BS/UE applies to a neighboring BS/UE receiving the signal.

Among the interferences, self-interference (SI) is the first challenge that needs to be overcome to manage FDR according to interference occurring only in the FDR system. There have been many discussions about self-interference cancellation (SIC) for the FDR operation. Basically, the SIC is implemented by compensating for the difference between the amplitude of the power used to send a transmit signal from a transmit antenna and the amplitude of the background noise present in the receive antenna.

Power control must be performed to transmit a signal with a power needed to support a determined data transfer rate in a mobile communication system. Excessively high power may cause unnecessary interference. On the other hand, excessively low power may produce a need for retransmission through increase of data transmission errors, thereby producing a longer transmission delay and a lower throughput.

Further, if a BS increases the transmit power of a wireless UE positioned at a cell boundary to allow higher transmit power for a wireless UE far from the BS than for a UE close to the BS in order to secure signal quality, this may result in interference to a neighboring cell. Accordingly, it is necessary to control transmit power to as low a level as possible. This control is referred to as (dynamic) power control.

Specifically, in dynamic power control, transmit power of a radio link is dynamically adjusted in order to compensate for instantaneous change of the channel state and the difference between channel states. This adjustment is intended to successfully transmit data without producing many errors. To this end, a receiver keeps an energy per bit to noise power spectral density ratio (Eb/No) constant. In principle, power control is performed to increase power of the transmitter when the condition of a radio link is not good, and to decrease the power of the transmitter when the condition of the radio link is good. This means that a certain data rate can be basically obtained despite change of the channel.

However, when there are many mobile communications, particularly, when packet data traffic is high, it is rarely necessary to provide a certain data rate over a radio link. From the perspective of users, it is better to provide as high a data rate as possible on the radio interface.

As far as an average data rate for a relatively short time period is kept constant, change of the instantaneous data rate hardly causes a problem. If a constant data rate is not required as mentioned above, dynamic transfer rate control may be adopted as link adaptation useable as an alternative to transmit power control.

The transfer rate control is not aimed at keeping the instantaneous radio link data rate constant regardless of the instantaneous channel state. Rather, the data rate is dynamically adjusted to compensate for the changing channel state. Accordingly, the data rate is increased in a good channel state, but is reduced in the opposite situation.

Practically, the data rate of a radio link is controlled by adjusting the modulation scheme or channel coding rate. When the condition of the radio link is good, Eb/No in the receiver is high, and the data rate is mainly restricted by the bandwidth of the radio link. In this case, it is advantageous to use higher order modulation. For this reason, link adaptation through transfer rate control is called Adaptive Modulation and Coding (AMC).

Figure 9:
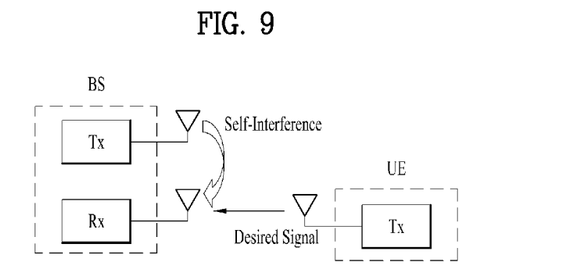
FIG. 9 is a reference diagram illustrating self-interference.

FIG. 9 is a reference diagram illustrating a case where self-interference occurs in a BS. Specifically, the receiver of a BS receives a desired signal from a UE, but self-interference occurs between the desired signal and a transmit signal of the BS which uses the same resource as the desired signal. That is, when transmission and reception are performed simultaneously using the same time and frequency resource, the transmitted signal of a specific node may apply strong self-interference to the received signal of the specific node. Since the self-interference signal is very strong compared to the desired signal, self-interference may cause the signal to interference-plus-noise ratio (SINR) to decrease.

Hereinafter, a description will be given of a method of supporting power control and link adaptation (e.g., adaptive modulation and coding (AMC)) by distinguishing between failure of self-interference cancellation (SIC) and failure of desired signal decoding when cyclic redundancy check (CRC) finally fails in the RX chain of a specific node.

In a full-duplex radio (FDR) system, it is difficult to know the power of a received desired signal due to SIC, in contrast with the case of LTE. In addition, the SIC operation does not always ensure expected SIC performance (e.g., variation of the SIC performance occurs according to change in the environment in applying adaptive SIC), and accordingly when CRC fails, it is not clear whether the failure has been caused by SIC performance or desired signal decoding.

For example, if the failure is related to SIC, the transmit (Tx) power of the BS maybe lowered, a parameter used for adaptive SIC may be changed, or the operation may be switched to a half-duplex operation. On the other hand, if failure has occurred due to failure of desired signal decoding, i) lowering the Modulation and Coding Scheme (MCS) level, ii) increasing the Tx power of the UE, or iii) switching to the half-duplex operation may be considered. Accordingly, by analyzing whether the failure has occurred according to SIC or desired signal decoding, a corresponding operation is preferably performed.

Typically, after CRC fails, the following two events occur regarding determination of SIC failure and determination of failure of the desired signal decoding.

1) If SIC fails, desired signal decoding surely fails. Accordingly, when SIC fails, it is not necessary to check failure of CRC.

2) If SIC is successful, success of CRC depends on desired signal decoding. Accordingly, when SIC is successful, the CRC is checked after desired signal decoding is performed.

That is, whether or not the desired signal decoding is successful may be known from CRC, and thus the cause of failure of CRC may be classified by checking whether SIC fails and CRC fails.

Hereinafter, a description will be given of a method of determining whether SIC has failed according to Rules 1 to 3 given below.

Rule 1) If a difference between a certain number of consecutively detected values (e.g., a few consecutive samples) is less than or equal to '0' after analog-to-digital conversion (i.e. saturation), it is considered that SIC has failed.

Rule 2) if the degree of displacement of an error vector magnitude (EVM) from a constellation point is greater than a threshold in the demodulation step, it is considered that SIC has failed. Herein, the degree of displacement represents the sum of residual self-interference after SIC and a desired signal. The operation of checking whether SIC has failed will be described in more detail below.

2-A: If the transmit power of the desired signal is greater than the EVM, it may be confirmed that SIC has failed.

2-B: A previously stored EVM value for previous successful decoding (i.e., success of CRC) of the desired signal is used. For example, if a value obtained by applying the power offset of the desired signal to the greatest value among the stored EVM values is greater than the current EVM value, it may be confirmed that SIC has failed.

Rule 3) If similarity between a restored signal and a self-interference signal, which is a signal known by performing error correction code decoding is high, it is considered that SIC has failed. A typical error correction code is intended to restore a desired signal. However, when the procedure of restoring the error correction code is performed due to residual self-interference, a transmit (Tx) signal of the BS is restored if the strength of the residual self-interference is greater than that of the desired signal. Accordingly, after restoration of the error correction code is performed for the received signal, SIC failure may be determined by checking whether similarity between the result of restoration and the Tx signal of the BS, which is a known signal, is higher than or equal to a certain percentage (e.g., x %).

In the case of Rules 1 and 2, decoding of the error correction code is not performed. In Rule 3, if the error correction code uses repetitive decoding, SIC failure may be checked and decoding may be stopped before decoding is performed a predetermined number of times.

Table 3 illustrates a method of determining power control and AMC application by checking occurrence of failure (Herein, switching to a half-duplex mode is excluded).

TABLE 3

|  |  | SIC | |
| --- | --- | --- | --- |
|  |  | Success | Failure |
| Desired signal decoding | Success | MCS level ↑ | Transmit power ↓ |
|  | Failure | MCS level ↓ | |

That is, if SIC fails, the transmit power may be lowered, or the amplitude of residual self-interference signal may be reduced by changing the parameter used for adaptive SIC.

If SIC fails, switching between operations for the desired signal does not affect the residual self-interference signal, and thus an operation for the desired signal may not be indicated.

Alternatively, in order to enhance the reception performance for the desired signal over the residual self-interference signal, increasing the transmit power of the desired signal may be indicated. In this case, the power increment may be determined in consideration of the EVM calculated in Rule 2.

If SIC is successful, an MCS level change or power control technique as used in LTE may be used. For details of power control in the LTE system, refer to 3GPP TS 36.213. In addition, a power control technique suitable for FDR in consideration of SI and IDI may be used.

Figure 10:
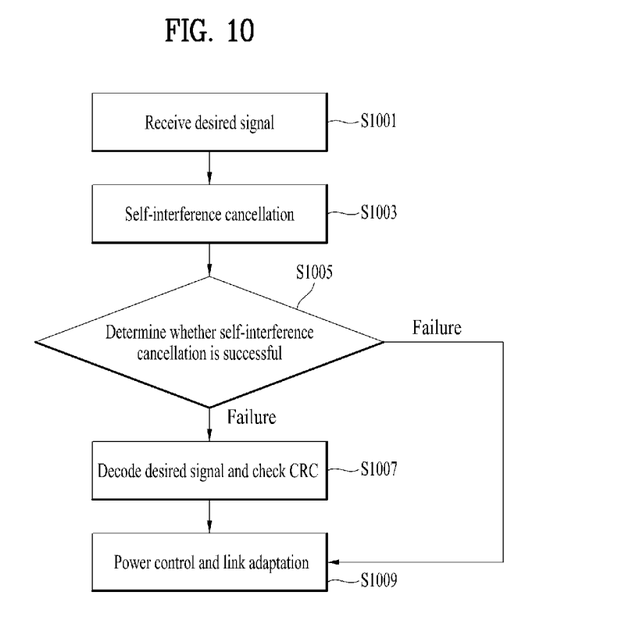
FIG. 10 is a reference diagram illustrating self-interference cancellation according to an embodiment of the present invention.

Hereinafter, an embodiment of the present invention will be specifically described with reference to FIG. 10.

First, a network node (e.g., a BS) receives a desired signal from a UE (S1001). Self-interference may occur in the received desired signal due to a transmitted signal of the network node which uses the same radio resource in the FDR system.

Accordingly, the network node performs an operation to cancel self-interference between the desired signal and the transmitted signal of the network node (S1003).

After step S1003, the network node may determine whether self-interference cancellation is successful (S1005).

If it is determined that self-interference cancellation is successful, desired signal decoding is performed, and CRC is additionally checked (S1007).

The network node performs power control and link adaptation in consideration of whether the self-interference cancellation is successful and whether the desired signal decoding is successful according to the result of checking of CRC (S1009).

Figure 11:
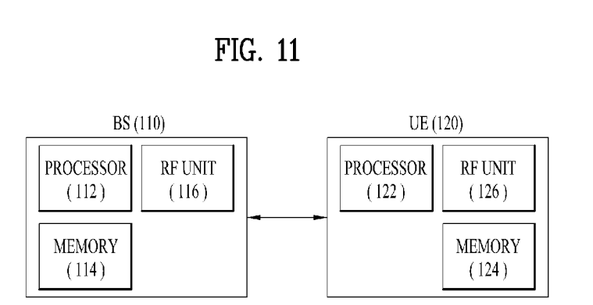
FIG. 11 illustrates a BS and UE which are applicable to an embodiment of the present invention.

FIG. 11 illustrates a BS and UE which are applicable to an embodiment of the present invention.

If a wireless communication system includes a relay, communication on the backhaul link is performed between the BS and the relay, and application on an access link is performed between the relay and the UE. Accordingly, the BS or UE illustrated in the figure may be replaced by a relay according to a situation.

Referring to FIG. 11, a wireless communication system includes a BS 110 and a UE 120. The BS 110 includes a processor 112, a memory 114, and a radio frequency (RF) unit 116. The processor 112 may be configured to implement the procedures and/or methods proposed herein. The memory 114 is connected to the processor 112 and stores various kinds of information related to operation of the processor 112. The RF unit 116 is connected to the processor 112 and transmits and/or receives a radio signal. The UE 120 includes a processor 122, a memory 124, and an RF unit 126. The processor 122 may be configured to implement procedures and/or methods proposed herein. The memory 124 is connected to the processor 122 and stores various kinds of information related to operation of the processor 122. They RF unit 126 is connected to the processor 122 and transmits and/or receives a radio signal. The BS 110 and/or the UE 120 may have a single antenna or multiple antennas.

The embodiments described above are constructed by combining elements and features of the present invention in a predetermined form. The elements or features should be considered selective unless explicitly mentioned otherwise. Each of the elements or features can be implemented without being combined with other elements. In addition, some elements and/or features may be combined to configure an embodiment of the present invention. The ordering of the operations discussed in the embodiments of the present invention may be changed. Some elements or features of one embodiment may also be included in another embodiment, or may be replaced by corresponding elements or features of another embodiment. It is apparent that claims that are not explicitly cited in each other in the appended claims may be presented in combination as an embodiment of the present invention or included as a new claim by subsequent amendment after the application is filed.

In this specification, a specific operation described as being performed by a BS may be performed by an upper node in some cases. That is, it is apparent that various operations performed for communication with a UE in a network constituted by a plurality of network nodes including a BS may be performed by the BS or other network nodes. The term "BS" may be replaced with the terms "fixed station", "Node B", "eNode B (eNB)", "Access Point (AP)", etc.

The embodiments of the present invention may be implemented through various means, for example, hardware, firmware, software, or a combination thereof. When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, or the like.

When implemented by firmware or software, an embodiment of the present invention may be embodied as a module, a procedure, or a function that performs the functions or operations described above. Software code may be stored in a memory unit and executed by a processor.

The memory unit is located at the interior or exterior of the processor and may transmit and receive data to and from the processor via various known means.

The present invention may be carried out in specific forms other than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein.

A method for power control in the competition in a full-duplex radio communication system and an apparatus for the same have been described above focusing on exemplary application thereof to a 3GPP LTE system. However, the method and apparatus may also be applied to various wireless communication systems other than the 3GPP LTE system.

As apparent from the above description, the present invention has effects as follows.

According to an embodiment of the present invention, power control and link adaptation may be effectively performed in a full-duplex radio communication system.

The effects that can be obtained from the present invention are not limited to the aforementioned effects, and other effects may be clearly understood by those skilled in the art from the descriptions given below.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of performing self-interference cancellation in a network node supporting full-duplex communication, the method comprising:
   receiving a desired signal from a user equipment (UE);
   performing cancellation of self-interference according to a transmitted signal of the network node, the transmitted signal using the same radio resource as the desired signal;
   determining whether the cancellation of the self-interference is successful according to a difference of an error vector magnitude (EVM),
   wherein the cancellation of the self-interference is determined to be failed, when the difference of the error vector magnitude (EVM) from the constellation point is greater than a threshold in a demodulation operation, and
   wherein whether the difference is greater than the threshold is determined based on whether a strength of residual self-interference and a strength of the desired signal exceed a threshold after the cancellation of the self-interference;
   performing, upon determining that the cancellation of the self-interference is successful, decoding of the desired signal and checking cyclic redundancy check (CRC); and
   performing power control and link adaptation depending on success in performing the cancellation of the self-interference and a result of checking the CRC.

2. The method according to claim 1, wherein, when it is determined that the cancellation of the self-interference has failed, it is determined that the decoding of the desired signal has failed.

3. The method according to claim 1, wherein the performing of the power control and link adaptation comprises:
   reducing a transmit power when the cancellation of the self-interference has failed.

4. The method according to claim 1, wherein the performing of the power control and link adaptation comprises:
   raising a modulation and coding scheme (MCS) level when the cancellation of the self-interference and the CRC are successful.

5. The method according to claim 1, wherein the performing of the power control and link adaptation comprises:
   lowering a modulation and coding scheme (MCS) level when the cancellation of the self-interference is successful and the CRC fails.

6. A network node for supporting full-duplex communication and performing self-interference cancellation, the network node comprising:
   a radio frequency (RF) unit; and
   a processor, wherein the processor is configured to:
   receive a desired signal from a user equipment (UE);
   perform cancellation of self-interference according to a transmitted signal of the network node, the transmitted signal using the same radio resource as the desired signal;
   determine whether the cancellation of the self-interference is successful according to a difference of an error vector magnitude (EVM),
   wherein the cancellation of the self-interference is determined to be failed, when the difference of the error vector magnitude (EVM) from the constellation point is greater than a threshold in a demodulation operation, and
   wherein whether the difference is greater than the threshold is determined based on whether a strength of residual self-interference and a strength of the desired signal exceed a threshold after the cancellation of the self-interference;
   perform, upon determining that the cancellation of the self-interference is successful, decoding of the desired signal and checking cyclic redundancy check (CRC); and
   perform power control and link adaptation depending on success in performing the cancellation of the self-interference and a result of checking the CRC.

* * * * *